(12) United States Patent
Sawamoto et al.

(10) Patent No.: US 6,906,661 B2
(45) Date of Patent: Jun. 14, 2005

(54) OBJECT-DETECTING SYSTEM FOR VEHICLE

(75) Inventors: Kiichiro Sawamoto, Saitama (JP); Hiroyuki Ando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 10/682,296

(22) Filed: Oct. 10, 2003

(65) Prior Publication Data

US 2004/0227662 A1 Nov. 18, 2004

(30) Foreign Application Priority Data

Oct. 17, 2002 (JP) ........................................ 2002-302870
Jul. 7, 2003 (JP) ........................................ 2003-271264

(51) Int. Cl.[7] .............................................. G01S 13/93
(52) U.S. Cl. ........................ 342/70; 342/109; 342/111; 342/115; 342/192; 342/196
(58) Field of Search ............................... 342/70–72, 109, 342/111, 115, 192, 196; 340/435, 436; 701/301

(56) References Cited

U.S. PATENT DOCUMENTS

| | | | | |
|---|---|---|---|---|
| 5,963,162 A | * | 10/1999 | Mochizuki et al. | 342/70 |
| 6,072,422 A | * | 6/2000 | Yamada | 342/70 |
| 6,249,243 B1 | * | 6/2001 | Takagi | 342/70 |
| 6,317,073 B1 | * | 11/2001 | Tamatsu et al. | 342/70 |
| 6,369,747 B1 | * | 4/2002 | Ashihara | 342/70 |
| 2003/0048216 A1 | * | 3/2003 | Kishida | 342/70 |
| 2003/0085835 A1 | * | 5/2003 | Matsui et al. | 342/70 |
| 2003/0117312 A1 | * | 6/2003 | Nakanishi et al. | 342/70 |
| 2003/0142007 A1 | * | 7/2003 | Ono et al. | 342/70 |
| 2003/0179129 A1 | * | 9/2003 | Tamatsu et al. | 342/70 |
| 2004/0125011 A1 | * | 7/2004 | Kumon et al. | 342/70 |
| 2004/0150550 A1 | * | 8/2004 | Shouno et al. | 342/70 |
| 2004/0227662 A1 | * | 11/2004 | Sawamoto et al. | 342/70 |

FOREIGN PATENT DOCUMENTS

JP     3305624     7/1997

* cited by examiner

Primary Examiner—John B. Sotomayor
(74) Attorney, Agent, or Firm—Arent Fox PLLC

(57) ABSTRACT

In an object-detecting system using an FM-CW wave, points f1 to f4 corresponding to detection peaks of a reflected wave from a road-side object such as guardrail and points m1 and m2 corresponding to detection peaks of a reflected wave from a moving object such as a reflector of a preceding vehicle are indicated on two-dimensional coordinates along with the shape of a road ahead of a subject vehicle. Among the points f1 to f4, m1 and m2, the points f1 to f4 are determined as being provided by the reflected wave from the road-side object, and a distance from the subject vehicle to the object and a speed of the subject vehicle relative the object are calculated using the remaining points m1 and m2 excluding the points f1 to f4. Thus, only the moving object except the road-side object can be detected.

18 Claims, 13 Drawing Sheets

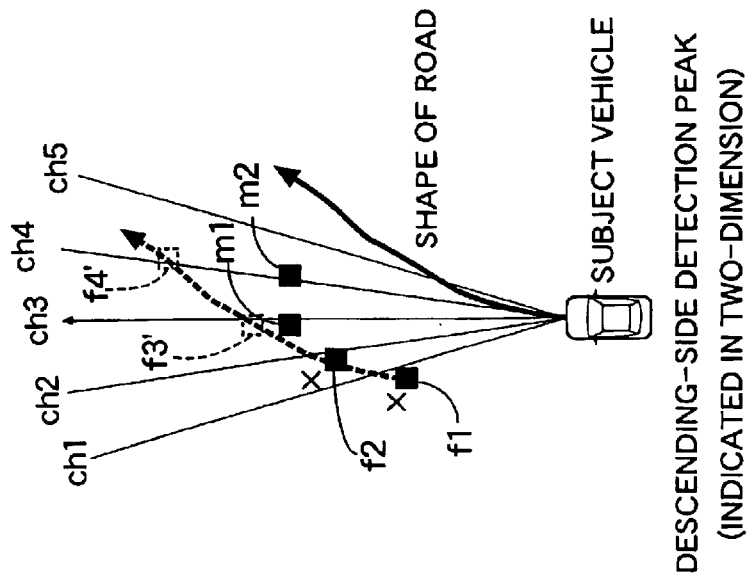
FIG.7A ASCENDING-SIDE DETECTION PEAK (INDICATED IN TWO-DIMENSION)
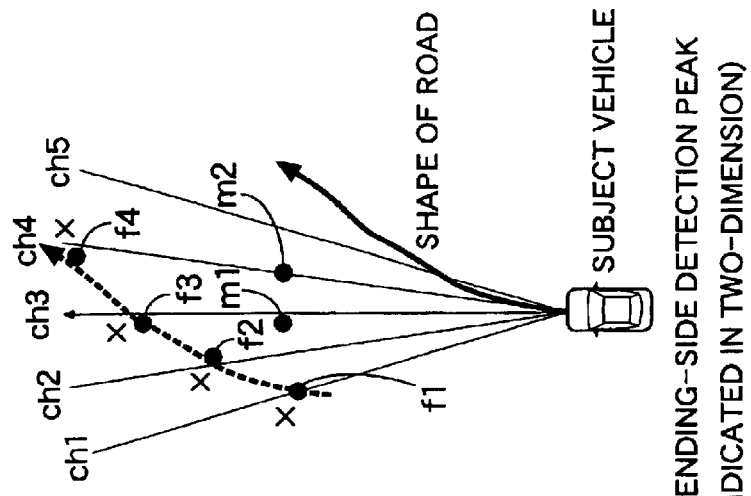
FIG.7B DESCENDING-SIDE DETECTION PEAK (INDICATED IN TWO-DIMENSION)

OBJECT-DETECTING SYSTEM FOR VEHICLE

BACKGROUND OF THE INVENTION

1. Field of the Invention

The present invention relates to an object-detecting system for a vehicle for detecting an object such as a vehicle traveling ahead of a subject vehicle (hereinafter referred to as "a preceding vehicle") by a radar system using FM-CW wave (frequency modulation continuous wave).

2. Description of the Related Art

A conventional object-detecting system for a vehicle is known from Japanese Patent No. 3305624.

As shown in FIG. 10, in the conventional object-detecting system using the FM-CW wave, a transmitting operation of a generator 3 is controlled in a modulated manner by an FM modulation control circuit based on a timing signal input thereto from a timing signal generating circuit 1, and a transmitted wave having a frequency modulated into a triangular waveform as shown by a solid line in FIG. 11 is transmitted from a transmitting/receiving antenna 6 through an amplifier 4 and a circulator 5. When a reflection wave resulting from the deflection of this FM-CW wave from an object such as a preceding vehicle is received by the transmitting/receiving antenna 6, the received wave appears behind the transmission wave at a frequency lower than that of the transmitted wave on an ascending side where the frequency of the transmitted wave is increased rectilinearly, and the received wave appears behind the transmitted wave at a frequency higher than that of the transmitted wave in a descending side where the frequency of the transmitted wave is decreased rectilinearly, as shown by a broken line in FIG. 11 in accordance with a distance to the object.

The wave received by the transmitting/receiving antenna 6 is input to a mixer 7 through the circulator 5. In addition to the wave transmitted from the circulator 5, a transmitted wave dispensed from the transmitted wave output from the generator 3 is input to the mixer 7 through the amplifier 8, and the transmitted wave and received wave are mixed together in the mixer 7, thereby producing a beat signal having a peak frequency Fup on the ascending side where the frequency of the transmitted wave is increased rectilinearly and having a peak frequency Fdn on the descending side where the frequency of the transmitted wave is decreased rectilinearly, as shown in FIG. 11.

The beat signal produced in the mixer 7 is amplified to an amplitude of a necessary level by the amplifier 9 and subjected to an A/D conversion at every sampling time by an A/D converter 10, and the digitized amplified data are stored and retained with time in a memory 11. A timing signal is input to the memory 11 from the timing signal generating circuit 1, and the memory 11 stores and retains data on every ascending side where the frequency of each of the transmitted and received waves are increased and every descending side where the frequency of each of the transmitted and received waves are decreased.

The data stored and retained in the memory 11 are input to CPU 12 including a frequency analyzing means 13, a detection peak determining means 14 and an object detecting means 15, and calculation based on the input data is carried out in the CPU 12.

The frequency analyzing means 13 is adapted to carry out frequency analysis of the data of the beat signal stored in the memory 11 to provide a spectral distribution. FFT (fast Fourier transform) is used as a technique for the frequency analysis.

The detection peak determining means 14 is adapted to detect a spectrum (a peak signal) in which the detection level is a maximum value at a predetermined detection threshold value or more, based on spectral data provided by the frequency analysis in the frequency analyzing means 13. When the relative speed of the subject vehicle and the preceding vehicle is zero, as shown in FIG. 11 an ascending-side peak signal and a descending-side peak signal overlap each other, but for example, when the subject vehicle is traveling at a relative speed to come close to a stationary object, as shown in FIG. 12, an ascending-side peak signal and a descending-side peak signal are detected symmetrically on opposite sides of a peak position at the time when the speed of the subject vehicle relative to the object is zero.

The object detecting means 15 is adapted to calculate a distance from the subject vehicle to an object and a speed of the subject vehicle relative to the object based on the ascending-side peak frequency Fup and the descending-side peak frequency Fdn provided by the detection peak determining means 14.

When an FM modulation width is represented by $\Delta f$; a light speed is represented by $c$; a modulation-repeating cycle is represented by Tm; a distance between the subject vehicle and an object is represented by r; a transmitted wave center frequency is represented by $f_0$; and a relative speed between the subject vehicle and the object is represented by v, the ascending-side peak frequency Fup is given according to $$Fup = (4 \cdot \Delta f \cdot r)/(c \cdot Tm) + \{(2 \cdot f_0)/c\} \cdot v \qquad (1)$$

and the descending-side peak frequency Fdn is given according to $$Fdn = (4 \cdot \Delta f \cdot r)/(c \cdot Tm) - \{(2 \cdot f_0)/c\} \cdot v \qquad (2)$$

Here, when the FM modulation width $\Delta f$, the modulation-repeating cycle Tm and the transmitted wave center frequency $f_0$ are supposed to be constant, the ascending-side peak frequency Fup and the descending-side peak frequency Fdn are represented by the following equation using constants k1 and k2, respectively:

$$Fup = r \cdot k_1 + v \cdot k_2 \qquad (3)$$

$$Fdn = r \cdot k_1 - v \cdot k_2 \qquad (4)$$

As apparent from the equations (3) and (4), when no relative speed v exists between the subject vehicle and the object (v=0), the ascending-side peak frequency Fup and the descending-side peak frequency Fdn are equal to each other (see FIG. 11). When a relative speed v exists between the subject vehicle and the object (v≠0), the ascending-side peak frequency Fup and the descending-side peak frequency Fdn are not equal to each other (see FIG. 12). A distance r to the object can be calculated based on the sum of the peak frequencies Fup and Fdn, and the relative speed v of the subject vehicle relative to the object can be calculated based on a difference between the peak frequencies Fup and Fdn.

When there are two preceding vehicles traveling at different relative speeds ahead of the subject vehicle, an ascending-side peak signal and a descending-side peak signal are generated for each of the preceding vehicles and hence, a total of four peak signals are provided. Therefore, if the pairing of the four peak signals (the combination of the ascending-side peak signals and the descending-side peak signals forming pairs) is erroneously performed, the following problem is encountered: distances from the subject vehicle to the objects and speeds of the subject vehicle relative to the objects cannot be detected accurately.

The object-detecting system described in the above-described patent document is designed so that the pairing is carried out based on past hysteresis data processed with time. However, the pairing is carried out for the combination of all the peak signals and for this reason, a long time is required for determining results of the pairing, leading to a problem in applying the object-detecting system to a system requiring a rapid control such as a vehicle-vehicle distance control system.

A particular problem in the case where the vehicle-vehicle distance control or the like is carried out using a radar device, lies in distinction between data for a moving object such as a preceding vehicle and data for a road-side object such as a guardrail and a sidewall. Therefore, if the moving object and the road-side object can be distinguished easily and reliably from each other, the performance of the radar device can be enhanced remarkably.

SUMMARY OF THE INVENTION

Accordingly, it is an object of the present invention to ensure that a moving object and a road-side object can be distinguished easily and reliably from each other in an object-detecting system using an FM-CW wave.

To achieve the above object, according to a first feature of the present invention, there is provided an object-detecting system for a vehicle, comprising a transmitting/receiving means for transmitting an FM-CW wave and receiving a wave resulting from the reflection of the FM-CW wave from an object, a mixer for mixing the transmitted wave and the received wave with each other to produce a beat signal, a frequency analyzing means for frequency analysis of the beat signal produced in the mixer, a detection peak determining means for determining, as a detection peak, any peak signal equal to or larger than a detection threshold value among peak signals obtained based on a result of the frequency analysis of ascending-side and descending-side frequencies by the frequency analyzing means, and an object detecting means adapted to calculate at least one of a distance from a subject vehicle to an object and a speed of the subject vehicle relative to the object, based on the ascending-side and descending-side detection peaks obtained in the detection peak determining means, wherein said object-detecting system further includes a travel locus presuming means for presuming a travel locus of the subject vehicle, and a road-side object peak determining means for determining at least a portion of the detection peaks as being a detection peak provided due to a road-side object, based on the presumed travel locus of the subject vehicle, and wherein the object detecting means is adapted to calculate at least one of the distance from the subject vehicle to the object and the speed of the subject vehicle relative to the object, based on the detection peaks other than the detection peaks of the road-side objects.

With the above arrangement, the road-side object peak determining means determines at least a portion of the detection peaks as being the detection peak provided due to the road-side object, based on the travel locus of the subject vehicle presumed by the travel locus presuming means, and the object detecting means calculates at least one of the distance from the subject vehicle to the object and the speed of the subject vehicle relative to the object, based on the detection peak other than the road-side object peak. Therefore, when both the road-side object and the moving object are detected, only the detection data of the moving object can be obtained by excluding the detection data of the road-side object.

According to a second feature of the present invention, in addition to the first feature, the road-side peak determining means is adapted to dispose a plurality of detection peaks on coordinates with a detecting direction and a peak frequency used as respective parameters, and to determine an arrangement of detection peaks resembling the travel locus presumed by the travel locus presuming means as being detection peaks provided due to the road-side objects.

With the above arrangement, the plurality of detection peaks are disposed on the coordinates with the detecting direction and the peak frequency used as respective parameters, and the arrangement of the detection peaks resembling the travel locus of the subject vehicle shown on the coordinates are determined as being the detection peaks. Therefore, the detection peak for the moving object and the detection peak for the road-side object can be distinguished easily and reliably from each other.

According to a third feature of the present invention, there is provided an object-detecting system for a vehicle, comprising a transmitting/receiving means for transmitting an FM-CW wave and receiving a wave resulting from the reflection of the FM-CW wave from an object, a mixer for mixing the transmitted wave and the received wave with each other to produce a beat signal, a frequency analyzing means for frequency analysis of the beat signal produced in the mixer, a detection peak determining means for determining, as a detection peak, any peak signal equal to or larger than a detection threshold value among peak signals obtained based on a result of the frequency analysis of ascending-side and descending-side frequencies by the frequency analyzing means, and an object detecting means adapted to calculate at least one of a distance from a subject vehicle to an object and a speed of the subject vehicle relative to the object, based on the ascending-side and descending-side detection peaks obtained in the detection peak determining means, wherein said object-detecting system further includes a subject vehicle position detecting means for detecting the current position of the subject vehicle, map information storing means for storing map information, a road shape presuming means for presuming the shape of a road in a traveling direction of the subject vehicle based on a subject vehicle position information detected by the subject vehicle position detecting means and the map information provided from the map information storing means, and a road-side object peak determining means for determining at least a portion of detection peaks as being a detection peak provided due to a road-side object, based on the presumed shape of the road in the traveling direction of the subject vehicle, and wherein the object detecting means is adapted to calculate at least one of the distance from the subject vehicle to the object and the speed of the subject vehicle relative to the object, based on the detection peaks other than the detection peaks of the road-side objects.

With the above arrangement, the road-side object peak determining means determines at least a portion of the detection peaks as being the detection peak provided due to the road-side object, based on the shape of the road in the traveling direction of the subject vehicle presumed by the road shape presuming means, and the object detecting means calculates at least one of the distance from the subject vehicle to the object and the speed of the subject vehicle relative to the object, based on the detection peak other than the road-side object peak. Therefore, when both the road-side object and the moving object are detected, only the detection data of the moving object can be obtained by excluding the detection data of the road-side object.

According to a fourth feature of the present invention, in addition to the third feature, the road-side object peak determining means is adapted to dispose a plurality of detection peaks on coordinates with a detecting direction and a peak frequency used as respective parameters and to determine the arrangement of detection peaks resembling the shape of the road presumed by the road shape presuming means as being a detection peak provided due to the road-side object.

With the above arrangement, the plurality of detection peaks are disposed on the coordinates with the detecting direction and the peak frequency used as the respective parameters, and the arrangement of detection peaks resembling the shape of the road presumed by the road shape presuming means and shown on the coordinates is determined as the detection peak provided due to the road-side object. Therefore, the detection peak for the moving object and the detection peak for the road-side object can be distinguished easily and reliably from each other.

According to a fifth feature of the present invention, there is provided an object-detecting system for a vehicle, comprising a transmitting/receiving means for transmitting an FM-CW wave and receiving a wave resulting from the reflection of the FM-CW wave from an object, a mixer for mixing the transmitted wave and the received wave with each other to produce a beat signal, a frequency analyzing means for frequency analysis of the beat signal produced in the mixer, a detection peak determining means for determining, as a detection peak, any detection peak signal equal to or larger than a detection threshold value among peak signals obtained based on a result of the frequency analysis of ascending-side and descending-side frequencies by the frequency analyzing means, and an object detecting means adapted to calculate at least one of a distance from a subject vehicle to an object and a speed of the subject vehicle relative to the object, based on the ascending-side and descending-side detection peaks obtained in the detection peak determining means, wherein said object-detecting system further includes a road-vehicle communication means capable of providing information relating to the shape of a road in a traveling direction of the subject vehicle by carrying out the communication with a transmitting means mounted on the road, and a road-side object peak determining means for determining at least a portion of the detection peaks as being a detection peak provided due to the road-side object, based on the information relating to the shape of the road in the traveling direction of the subject vehicle provided by the road-vehicle communication means, and wherein the object detecting means is adapted to calculate at least one of the distance from the subject vehicle to the object and the speed of the subject vehicle relative to the object, based on the detection peaks other than the detection peaks of the road-side objects.

With the above arrangement, the road-side object peak determining means determines at least a portion of detection peaks as being the detection peak provided due to the road-side object, based on the information relating to the shape of the road in the traveling direction of the subject vehicle provided by the road-vehicle communication means, and the object detecting means calculates at least one of the distance from the subject vehicle to the object and the speed of the subject vehicle relative to the object, based on the detection peak other than the road-side object peak. Therefore, when both the road-side object and the moving object are detected, only the detection data of the moving object can be obtained by excluding the detection data of the road-side object.

According to a sixth feature of the present invention, in addition to the fifth feature, the road-side object peak determining means is adapted to dispose a plurality of detection peaks on coordinates with a detecting direction and a peak frequency used as respective parameters, and to determine an arrangement of detection peaks resembling the shape of the road provided by the road-vehicle communication means as being detection peaks provided due to the road-side objects.

With the above arrangement, the plurality of detection peaks are disposed on the coordinates with the detecting direction and the peak frequency used as respective parameters, and the arrangement of the detection peaks resembling the shape of the road provided by the road-vehicle communication means and shown on the coordinates are determined as being the detection peaks provided due to the road-side objects. Therefore, the detection peak for the moving object and the detection peak for the road-side object can be distinguished easily and reliably from each other.

According to a seventh feature of the present invention, in addition to any of the first to sixth features, when any of the ascending-side detection peaks is determined as being the detection peak provided due to the road-side object, the road-side object peak determining means determines the descending-side detection peak corresponding to the ascending-side detection peak as a detection peak provided due to the road-side object.

With the above arrangement, when any of the ascending-side detection peaks is determined as being the detection peak provided due to the road-side object, the descending-side detection peak corresponding to the ascending-side detection peak is determined as being the detection peak provided due to the road-side object. Therefore, the descending-side detection peak is not required to be subjected to the matching with the shape of the road, whereby the prompt determination is possible.

According to an eighth feature of the present invention, in addition to any of the first to sixth features, when the any of the descending-side detection peaks is determined as being a detection peak provided due to the road-side object, the road-side object peak determining means determines the ascending-side detection peak corresponding to the descending-side detection peak as being a detection peak provided due to the road-side object.

With the above arrangement, when any of the descending-side detection peaks is determined as being the detection peak provided due to the road-side object, the ascending-side detection peak corresponding to the detected descending-side detection peak is determined as being the detection peak provided due to the road-side object. Therefore, the ascending-side detection peak is not required to be subjected to the matching with the shape of the road, whereby the prompt determination is possible.

A transmitting-receiving antenna 6 in each of embodiments corresponds to the transmitting/receiving means of the present invention.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7B show a first embodiment of the present invention, wherein

FIG. 1 is a diagram of the entire arrangement of an object detecting system;

FIG. 2 is a diagram showing the positional relationship between a subject vehicle, a preceding vehicle and a road;

FIG. 3 is a diagram showing four kinds of pairs of ascending-side and descending-side peak signals in a channel ch3;

FIG. 4 is a flow chart for explaining the operation;

FIG. 6 is a diagram showing the final paring of the ascending-side and descending-side peak signals in the channel ch3; and FIGS. 7A and 7B are diagrams similar to FIGS. 5A and 5B, but showing a case where a descending-side detection peak corresponding to a road-side object is missing.

FIGS. 10 to 13 show a prior art example, wherein

FIG. 10 is a diagram of the entire arrangement of an object-detecting system;

FIG. 11 is a diagram for explaining the operation of a radar device when a subject vehicle is traveling to follow a moving object traveling at a relative speed of zero;

FIG. 12 is a diagram for explaining the operation of the radar device when the subject vehicle is traveling to come close to a stationary object; and FIG. 13 is a diagram for explaining the operation of the radar device when the subject vehicle is traveling to follow a plurality of moving objects traveling at different relative speeds.

DESCRIPTION OF THE PREFERRED EMBODIMENTS

A first embodiment of the present invention will now be described with reference to FIGS. 1 to 7B.

Figure 1:
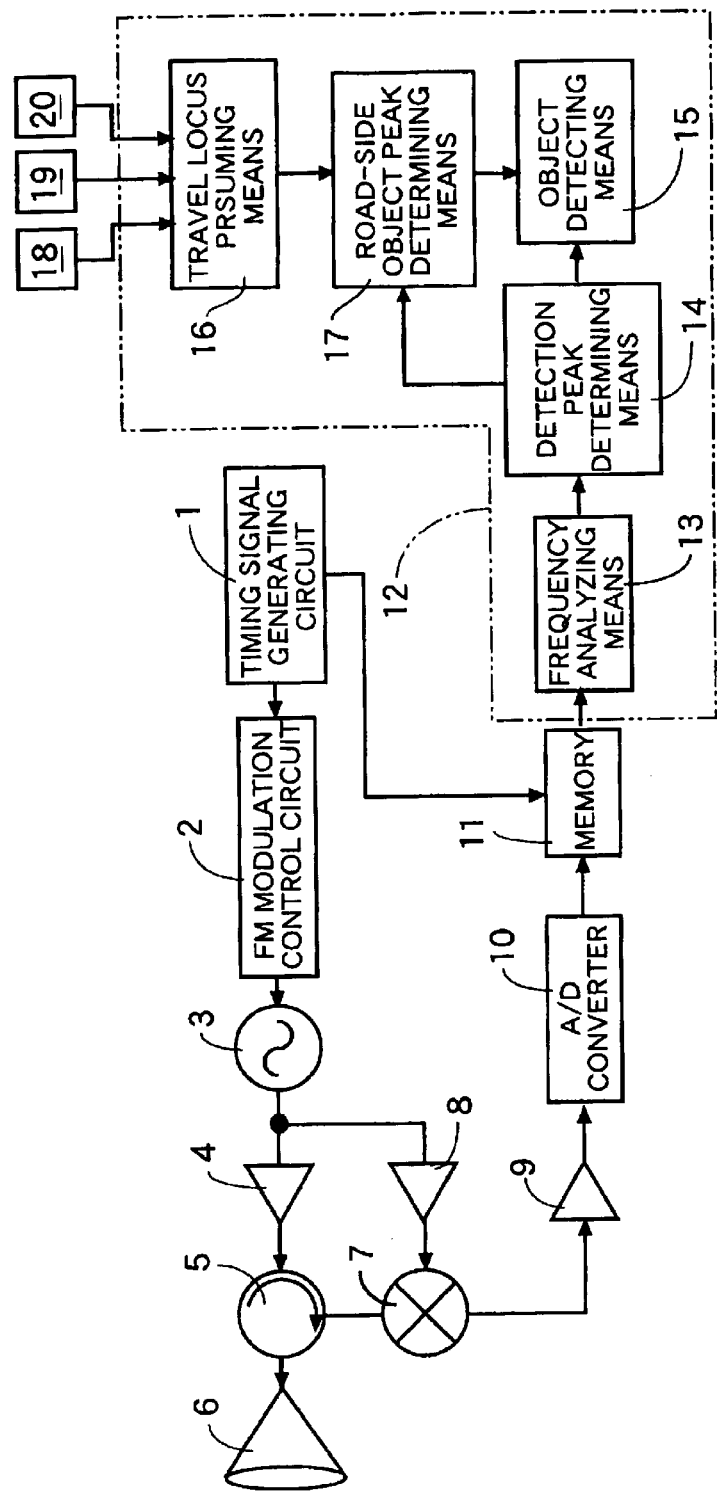
Figure 10:
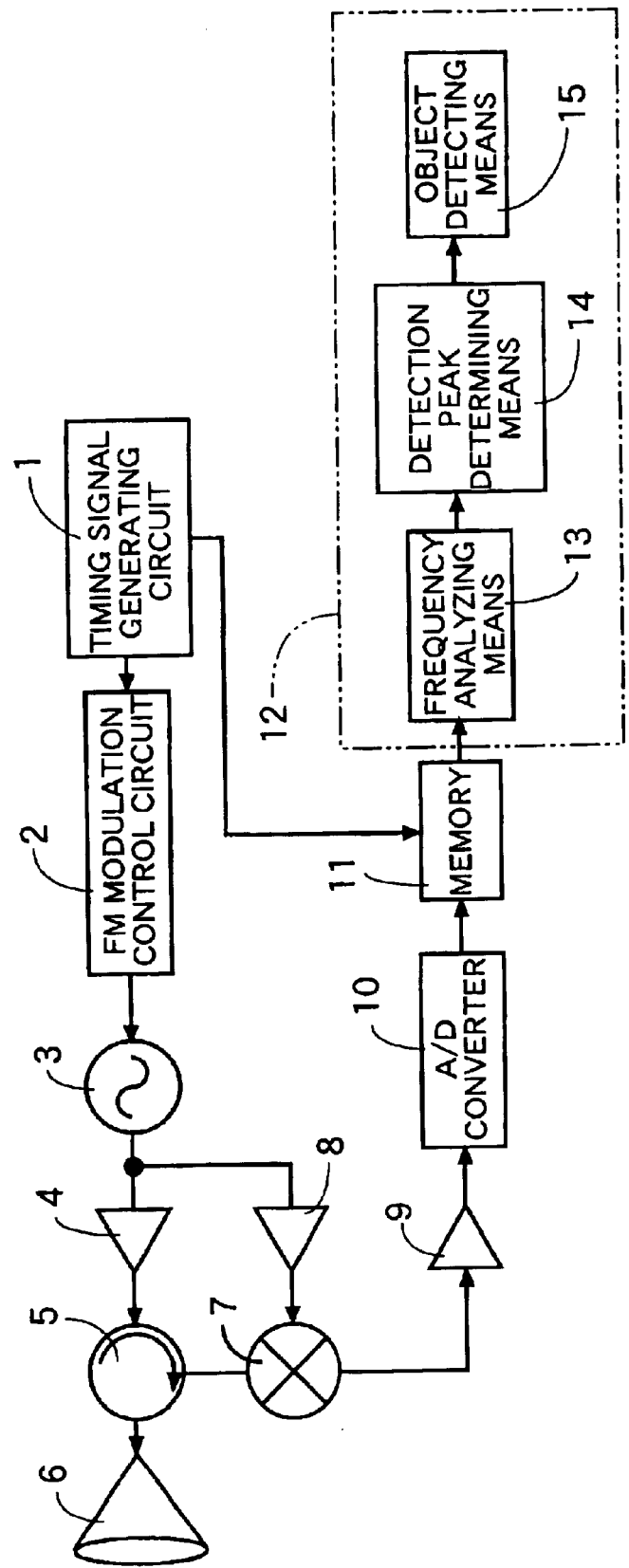
Figure 11:
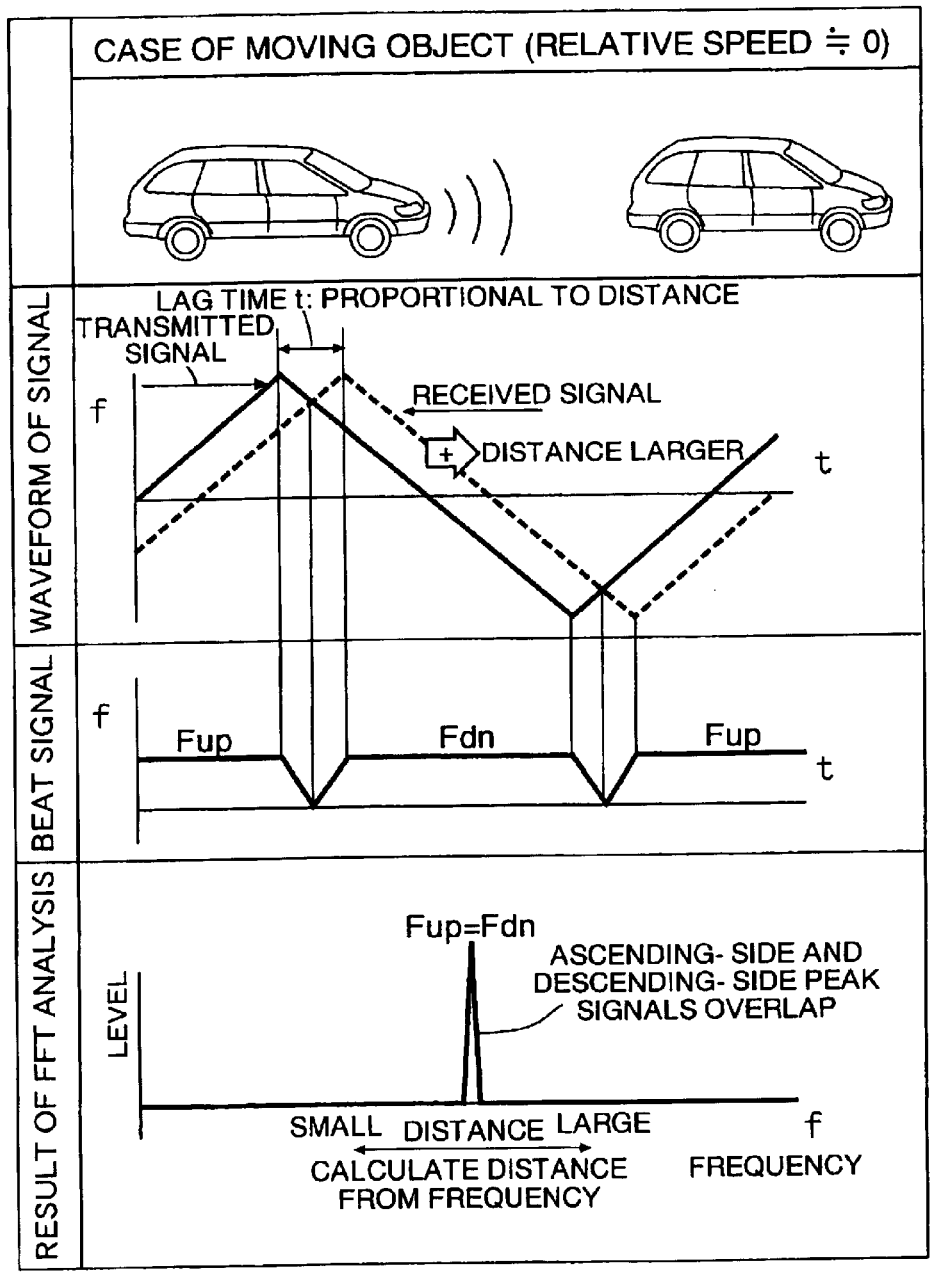
Figure 12:
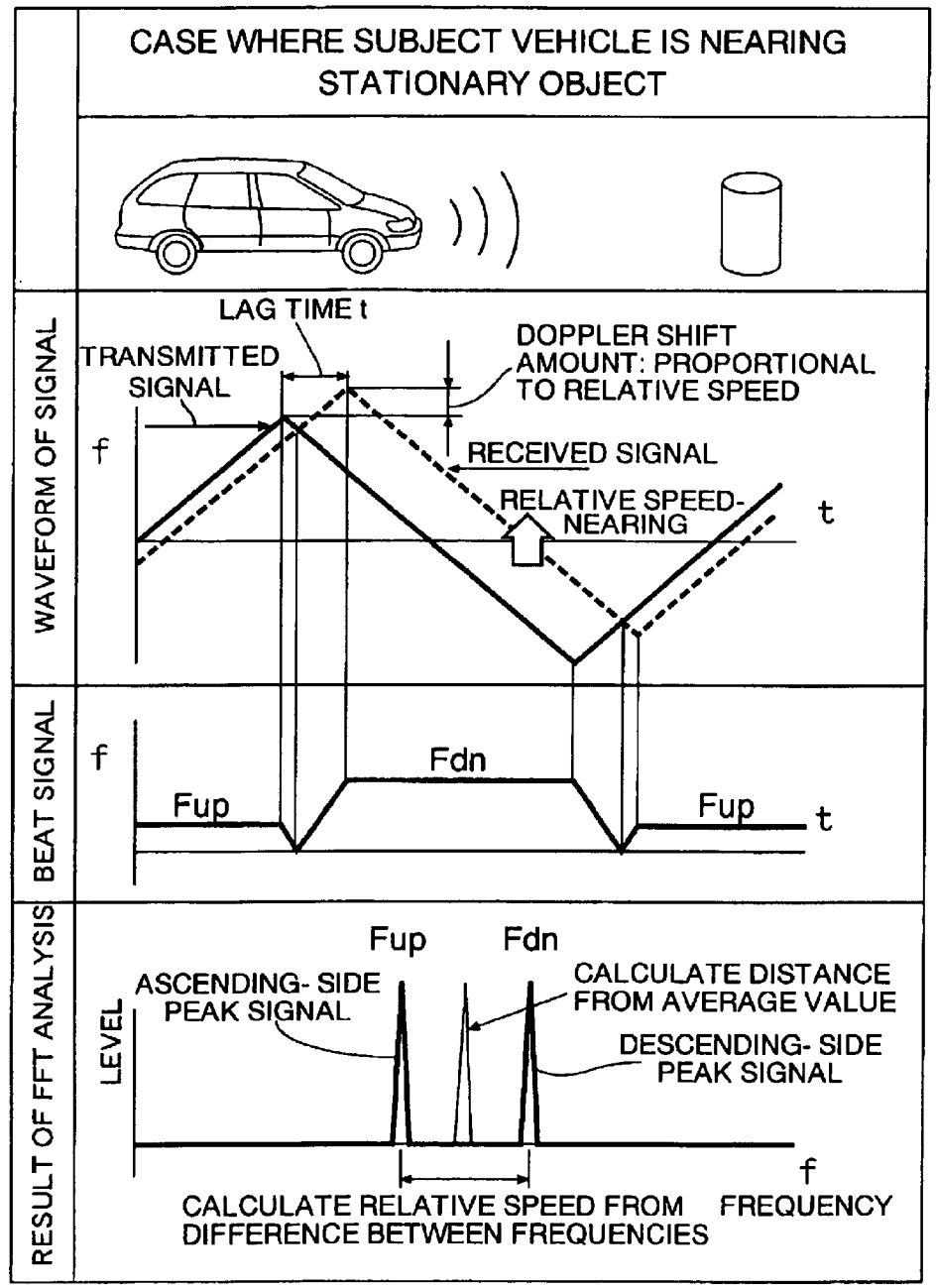
Figure 13:
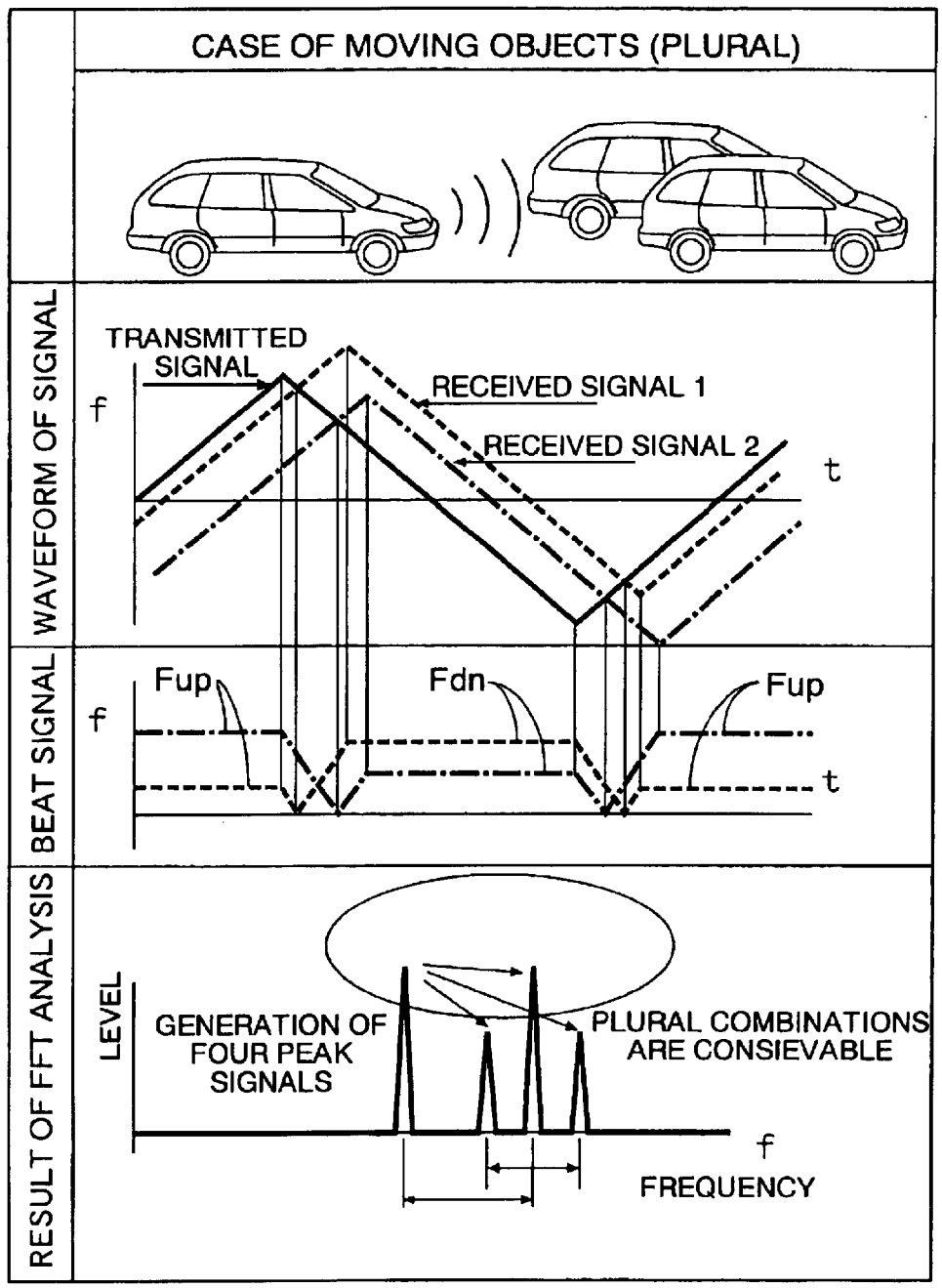

A circuit arrangement of a CPU 12 of an object-detecting system according to this embodiment is shown in FIG. 1. The arrangement and functions of components other than CPU 12 are the same as those in FIG. 8. A conventional CPU 12 described with reference to FIG. 10 includes a frequency analyzing means 13, a detection peak determining means 14, and an object detecting means 15, but the CPU 12 in this embodiment includes, in addition to such means, a travel locus presuming means 16 and a road-side object peak determining means 17.

The travel locus presuming means 16 is connected to a vehicle speed detecting means 18, a yaw rate detecting means 19 and a steering angle detecting means 20, and presumes a future travel locus of a subject vehicle based on a vehicle speed, a yaw rate and a steering angle of the subject vehicle. The road-side object peak determining means 17 recognizes a detection peak for a moving object such as a preceding vehicle which should be intrinsically detected by excluding a road-side object detection peak from detection peaks provided in the detection peak determining means 14 based on the locus of the subject vehicle presumed by the travel locus presuming means 16, so that the object detecting means 15 can detect only the moving object properly.

Figure 2:
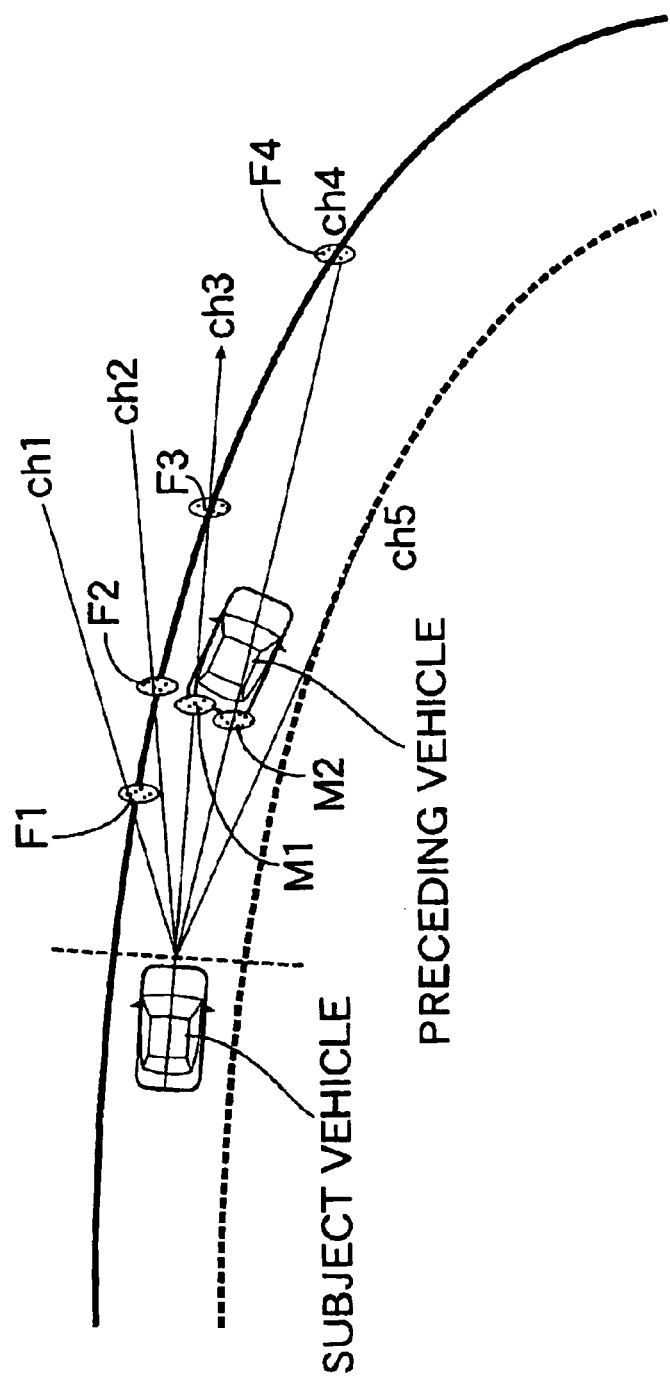

FIG. 2 shows a subject vehicle which is traveling to follow a preceding vehicle. Among five channels ch1 to ch5 of the object detecting system mounted on the subject vehicle, two channels ch1 and ch2 detect only road-side objects F1 and F2 such as a guardrail; the other two channels ch3 and ch4 detect road-side objects F3 and F4 and moving objects M1 and M2 such as a reflector of the preceding vehicle; and the remaining channel ch5 detects nothing.

Figure 3:
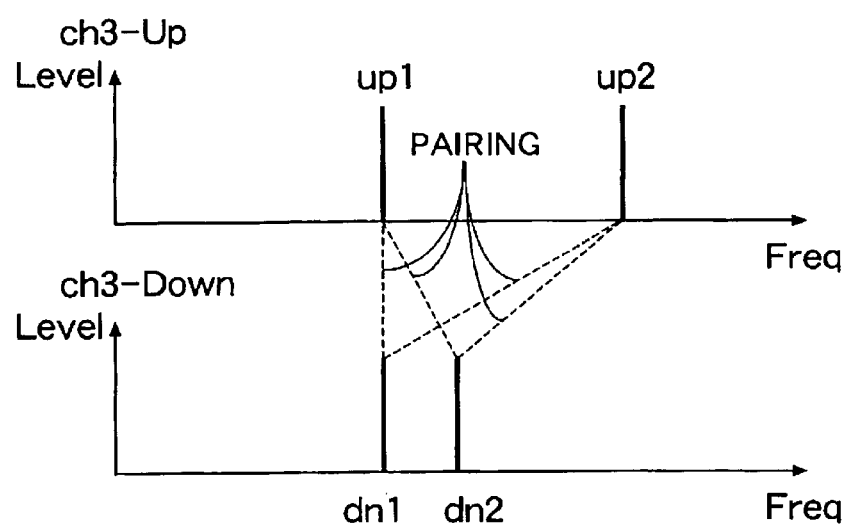

When attention is paid to the channel ch3 (and also to the channel ch4), the channel ch3 detects both the road-side object F3 and the moving object M1 simultaneously and hence, two ascending-side peak signals up1 and up2 appear, and two descending-side peak signals dn1 and dn2 also appear, as shown in FIG. 3. Therefore, when the two ascending-side peak signals up1 and up2 and the two descending-side peak signals dn1 and dn2 are paired, four kinds of pairs Pair1 to Pair4 are provided as shown in Table 1. If the paring is not determined, the road-side object F3 and the moving object M1 detected by the channel ch3 cannot be distinguished from each other.

TABLE 1

|  | dn1 | dn2 |
| --- | --- | --- |
| up1 | Pair1 | Pair3 |
| up2 | Pair2 | Pair4 |

Figure 4:
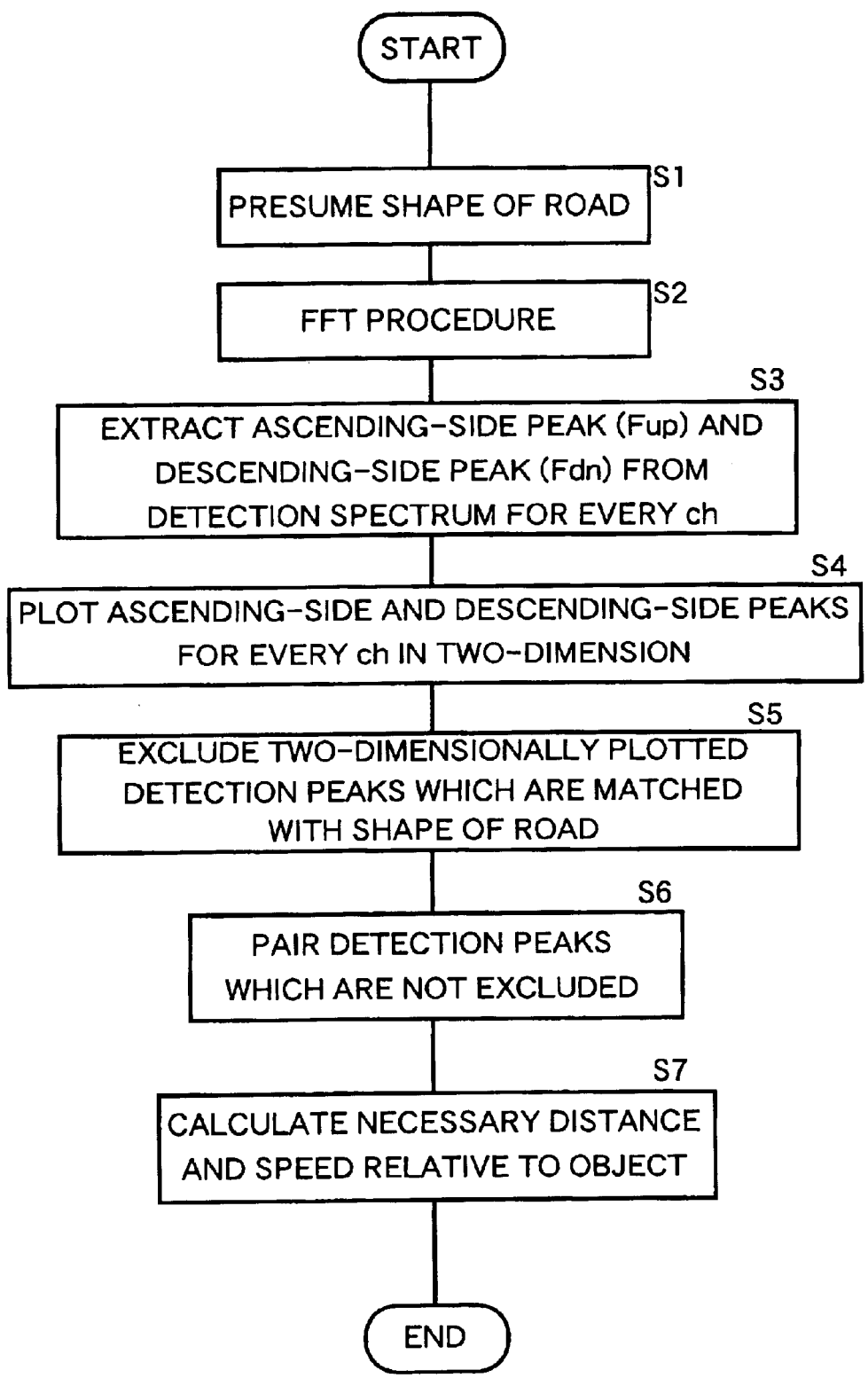

Thus, the paring is determined as follows:

In a flow chart shown in FIG. 4, the shape of a road ahead of the subject vehicle is first presumed at Step S1. The shape of the road is determined from a travel locus of the subject vehicle presumed by the travel locus presuming means 16, but may be determined by another method based on information from an infrastructural device such as navigator and a beacon mounted on the road.

At subsequent Step 2, data of a beat signal stored in a memory 11 are subjected to an FFT treatment by the frequency analyzing means 13 to obtain a detection spectrum. At next Step S3, a total of six ascending-side peak frequencies Fup and a total of six descending-side peak frequencies Fdn corresponding to the four road-side objects F1 to F4 and the two moving objects m1 and m2 are extracted in correspondence to the channels ch1 to ch5 from the detection spectrum. At next Step S4, the six ascending-side peak frequencies Fup and the six descending-side peak frequencies Fdn corresponding to the channels ch1 to ch5 are plotted on two different sets of two-dimensional coordinates, respectively. The coordinates are polar coordinates with an angle and a radius used as parameters, wherein a direction of each of the channels ch1 to ch5 corresponds to the angle, and a distance (peak frequency) to a detected object corresponds to the radius. A presumed shape of a road is also shown in the two-dimensional coordinates.

Figure 5A:
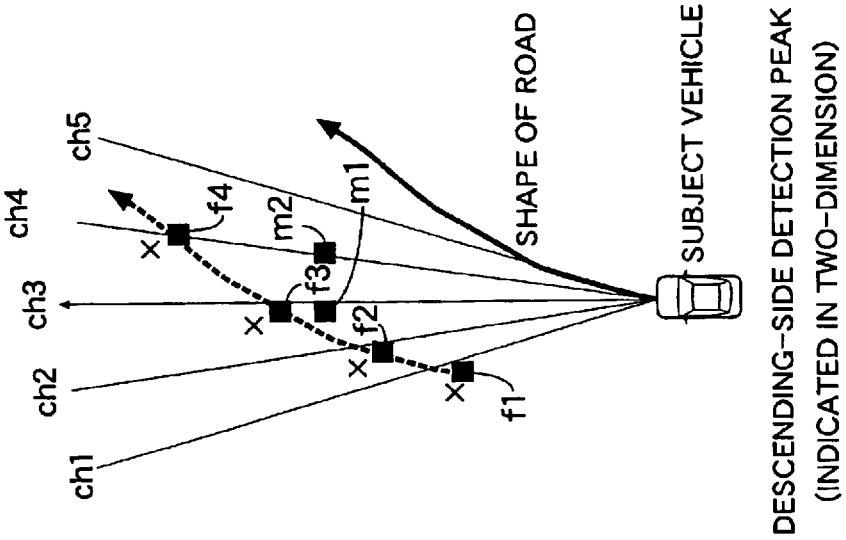
FIGS. 5A and 5B are diagrams showing two-dimensional coordinates for carrying out the pairing.

The six ascending-side peak frequencies Fup and the presumed shape of the road are shown in the two-dimensional coordinates in FIG. 5A. Four points f1 to f4 in the two-dimensional coordinates are arranged along the shape of the road and hence, are determined as corresponding to the four road-side objects F1 to F4. On the other hand, remaining two points m1 and m2 are not along the shape of the road and hence, are determined as corresponding to the moving objects M1 and M2 which are reflectors of preceding vehicles. The six descending-side peak frequencies and the presumed shape of the road are shown in the two-dimensional coordinates in FIG. 5B. Four points f1 to f4 in the two-dimensional coordinates are arranged along the shape of the road and hence, are determined as corresponding to the four road-side objects F1 to F4. On the other hand, remaining two points m1 and m2 are not along the shape of the road and hence, are determined as corresponding to the moving objects M1 and M2 which are the reflectors of the preceding vehicles.

Figure 5B:
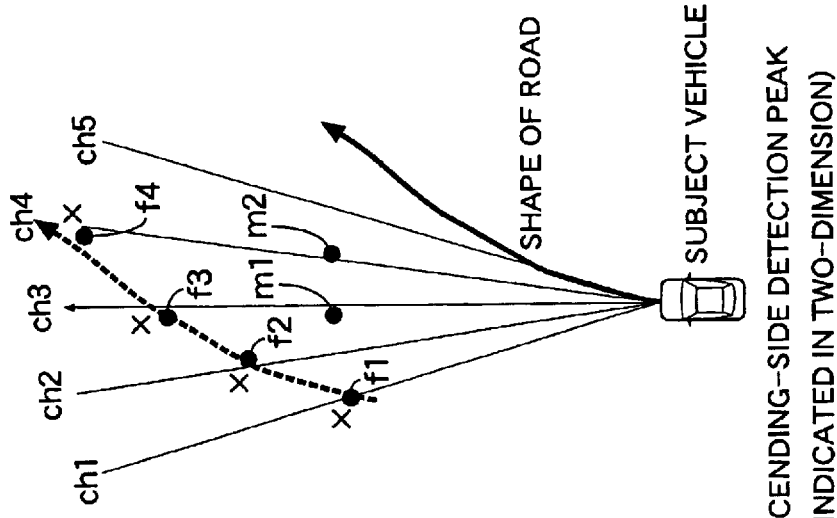
Figure 6:
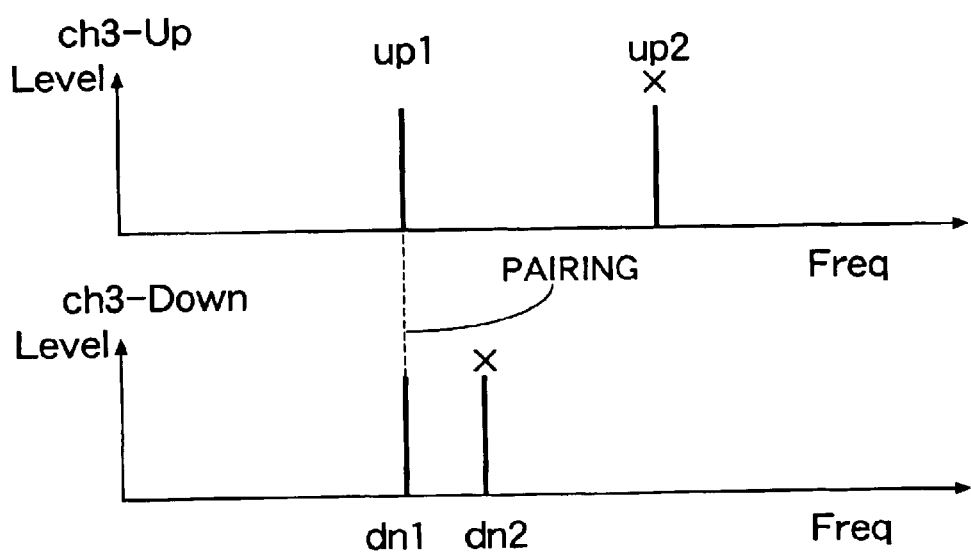

From the forgoing, at step 5, peak signals of the points f1 to f4 (shown by marks x) corresponding to the road-side objects F1 to F4 are excluded from the six points f1 to f6 in the two-dimensional coordinates in each of FIGS. 5A and 5B. More specifically, in an example of the channel ch3 shown in FIG. 6, the detection ascending-side peak up2, which corresponds to the road-side object F3, among the detection ascending-side peaks up1 and up2 is excluded, and the detection descending-side peak dn2, which corresponds to the road-side object F3, among the detection descending-side peaks dn1 and dn2 is excluded. Thus, Pair1 (namely, the detection peaks up1 and dn1) surrounded by a square shown in FIG. 2 can be determined as corresponding to the moving object M1.

TABLE 2

|  | dn1 | dn2 |
| --- | --- | --- |
| up1 | Pair1 | Pair3 |
| up2 | Pair2 | Pair4 |

At subsequent Step S6, the two detection peaks which have not been excluded (up1 and dn1 in an example in Table 2) are paired, and at Step S7, a distance to the object and a relative speed are calculated based on the ascending-side peak frequency Fup and the descending-side peak frequency Fdn corresponding to the paired detection peaks up1and dn1, whereby the point m1 in each of FIGS. 5A and 5B, namely, only the moving object M1 excluding the road-side objects F1 to F4 in FIG. 2 can be detected. Also with respect to the channel ch4, the point m2 in each of FIGS. 5A and 5B, namely, only the moving object M2 excluding the road-side objects F1 to F4 in FIG. 2 can be detected in a similar manner.

In this manner, among the plurality of detection peaks provided by the detection peak determining means 14, those disposed along the shape of the road are determined as being provided from the road-side objects and are excluded. Therefore, the necessary detection peak provided from the moving object can be extracted easily and reliably, so that only the moving object can be detected without need of the conventional complicated and time-consuming paring operation.

In FIGS. 5A and 5B, for example, when the four ascending-side points f1 to f4 (see FIG. 5A) are determined as being matched with the shape of the road and corresponding to the road-side objects F1 to F4, the four descending-side points f1 to f4 (see FIG. 5B) corresponding to the four ascending-side points f1 to f4 can be determined as corresponding to the road-side objects F1 to F4 without being subjected to the matching with the shape of the road. In contrast, when the four descending-side points f1 to f4 (see FIG. 5B) are determined as being matched and corresponding to the road-side objects F1 to F4, the four ascending-side points f1 to f4 (see FIG. 5A) corresponding to the four descending-side points f1 to f4 can be determined as corresponding to the road-side objects F1 to F4 without being subjected to the matching with the shape of the road. Thus, it is possible to carry out the determination of the road-side objects further promptly.

For example, even when the detection peaks of descending-side points f3' and f4' corresponding to the road-side objects F3 and F4 are missing for any reason as shown in FIG. 7B, the missing detection peaks can be determined by comparison with the detection peaks of the ascending-side points f3 and f4 shown in FIG. 7A.

Figure 8:
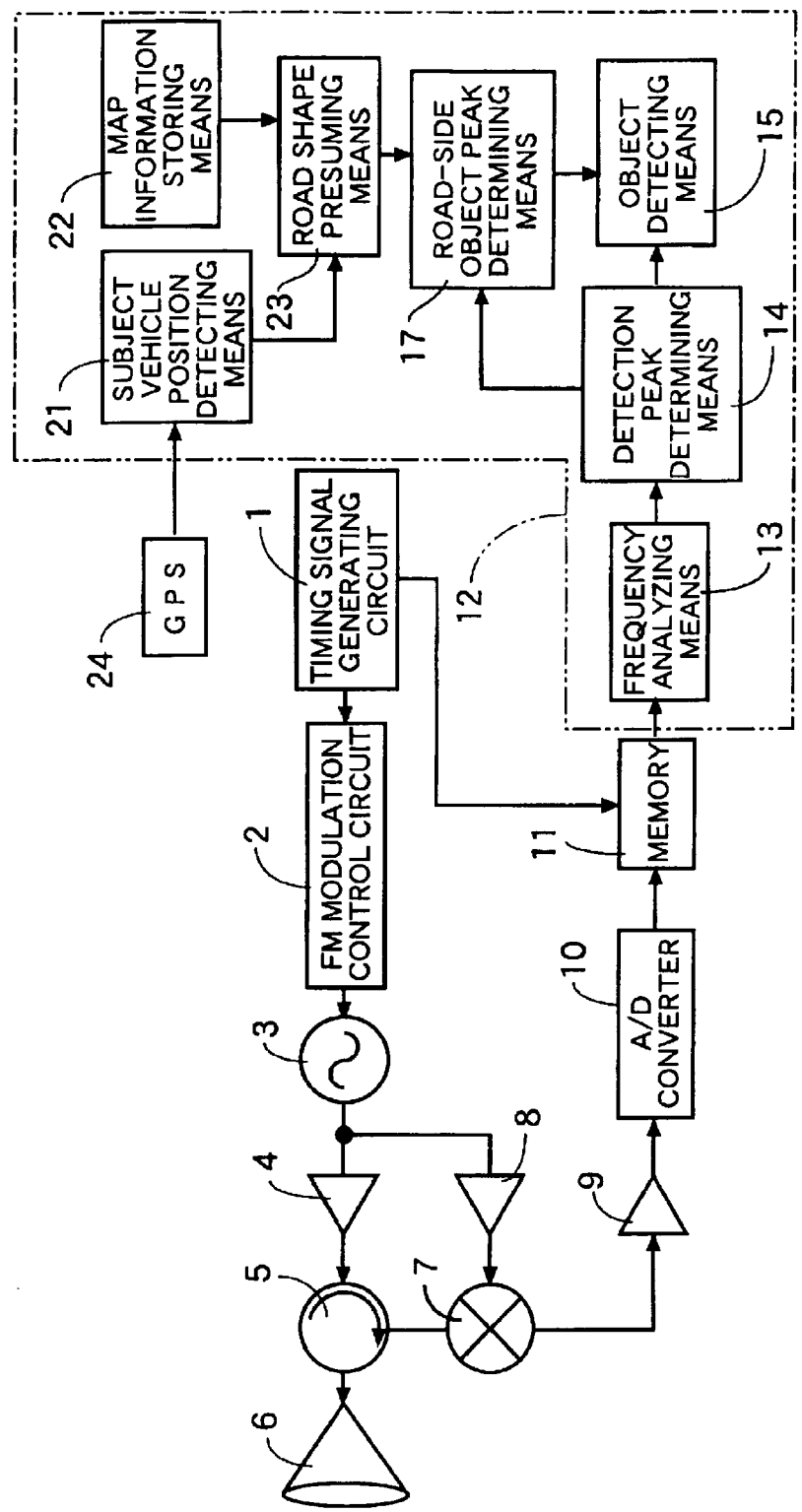
FIG. 8 is a diagram of the entire arrangement of an object-detecting system according to a second embodiment of the present invention.

FIG. 8 shows a second embodiment of the present invention. A CPU 12 in the second embodiment includes a subject vehicle position detecting means 21, map information storing means 22 and a road shape presuming means 23 in place of the travel locus presuming means 16 in the first embodiment. The subject vehicle position detecting means 21 is adapted to detect a current position of a subject vehicle by receiving a radiowave from a GPS satellite 24. The map information storing means 22 comprises a storage medium such as DVD and stores a wide range of road data in the form of an aggregate of coordinate points. The road shape presuming means 23 is adapted to presume the shape of a road in a traveling direction of the subject vehicle based on the position of the subject vehicle detected by the subject vehicle position detecting means 21 and the road data stored in the map information storing means 22. The functions of the subject vehicle position detecting means 21, the map information storing means 22 and the road shape presuming means 23 are similar to those provided in a navigation system, and the existing navigation system can be utilized for such functions.

Figure 9:
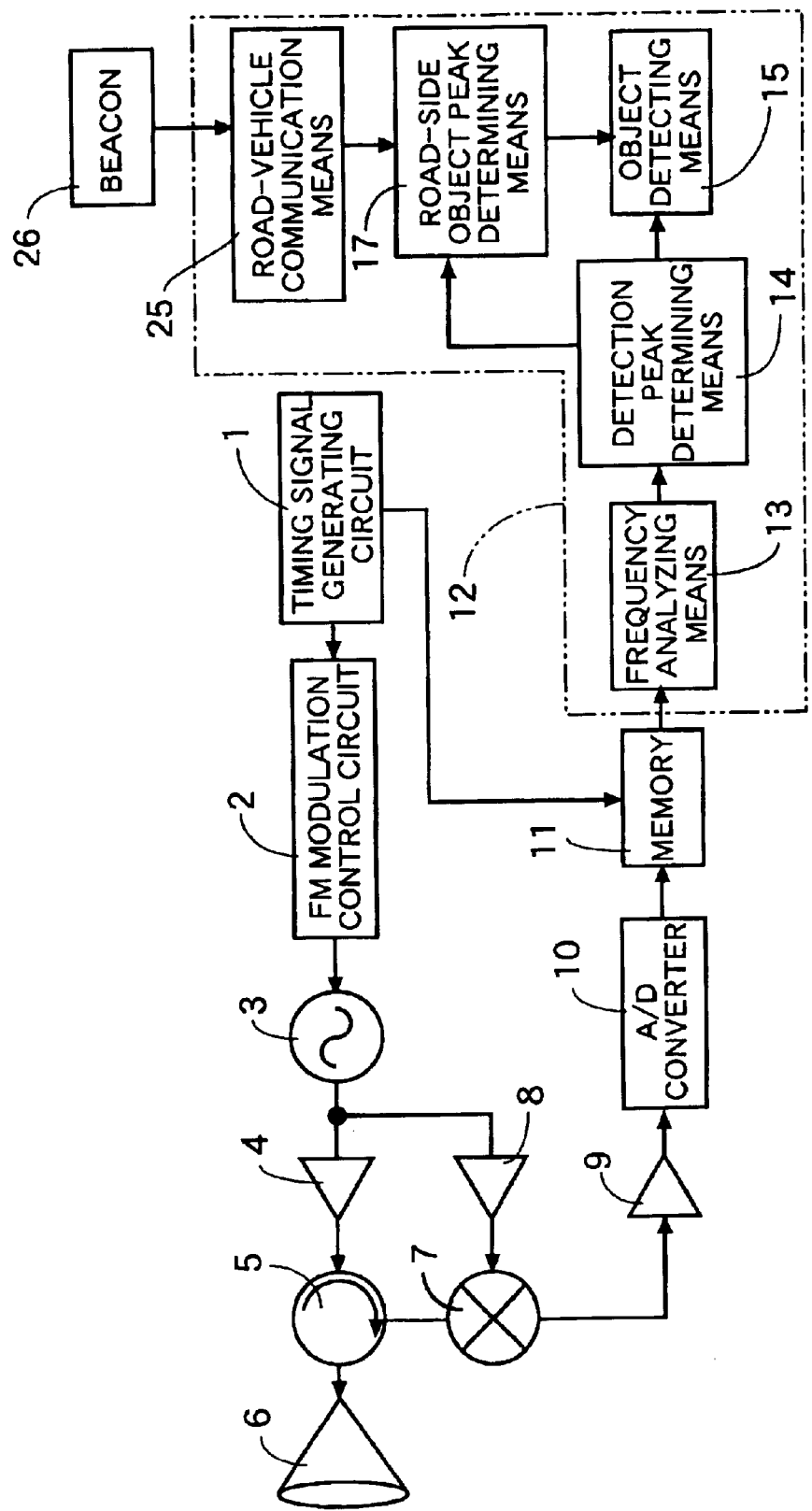
FIG. 9 is a diagram of the entire arrangement of an object-detecting system according to a third embodiment of the present invention.

FIG. 9 shows a third embodiment of the present invention. A CPU 12 in the third embodiment includes a road-vehicle communication means 25 in place of the travel locus presuming means 16 in the first embodiment. The road-vehicle communication means 25 is capable of obtaining information relating to the shape of a road in a traveling direction of a subject vehicle by carrying out the communication with transmitting means 26 such as beacons mounted at predetermined distances on the road.

Therefore, according to the second and third embodiments, a detection peak of a moving object such as a preceding vehicle which should be intrinsically detected can be recognized so that the object detecting means 15 can properly detect only the moving object, by excluding detection peaks of road-side objects from detection peaks provided by the detection peak determining means 17, as in the first embodiment, based on the shape of the road in the traveling direction of the subject vehicle provided by the road shape presuming means 23 or the road-vehicle communication means 25.

Thus, according also to the second and third embodiments, an operation and an effect similar to those in the above-described first embodiment can be achieved.

Although the embodiments of the present invention have been described in detail, it will be understood that various modifications in design may be made without departing from the subject matter of the invention defined in claims.

For example, the object-detecting system may be constructed with an arrangement using no circulator 6 by placing a transmitting antenna and a receiving antenna separately.

Objects other than road-side objects are referred to as moving objects for convenience in the embodiments, but the moving objects include a vehicle or the like stopped on a road.

What is claimed is:
1. An object-detecting system for a vehicle, comprising a transmitting/receiving means for transmitting an FM-CW wave and receiving a wave resulting from the reflection of the FM-CW wave from an object, a mixer for mixing the transmitted wave and the received wave with each other to produce a beat signal, a frequency analyzing means for frequency analysis of the beat signal produced in the mixer, a detection peak determining means for determining, as a detection peak, any peak signal equal to or larger than a detection threshold value among peak signals obtained based on a result of the frequency analysis of ascending-side and descending-side frequencies by the frequency analyzing means, and an object detecting means adapted to calculate at least one of a distance from a subject vehicle to an object and a speed of the subject vehicle relative to the object, based on the ascending-side and descending-side detection peaks obtained in the detection peak determining means, wherein said object-detecting system further includes a travel locus presuming means for presuming a travel locus of the subject vehicle, and a road-side object peak determining means for determining at least a portion of the detection peaks as being a detection peak provided due to a road-side object, based on the presumed travel locus of the subject vehicle, and wherein the object detecting means is adapted to calculate at least one of the distance from the subject vehicle to the object and the speed of the subject vehicle relative to the object, based on the detection peaks other than the detection peaks of the road-side objects.

2. An object-detecting system for a vehicle according to claim 1, wherein said road-side peak determining means is adapted to dispose a plurality of detection peaks on coordinates with a detecting direction and a peak frequency used as respective parameters, and to determine an arrangement of detection peaks resembling the travel locus presumed by the travel locus presuming means as being detection peaks provided due to the road-side objects.

3. An object-detecting system for a vehicle according to any of claim 2, wherein, when any of the ascending-side detection peaks is determined as being the detection peak provided due to the road-side object, said road-side object peak determining means determines the descending-side detection peak corresponding to the ascending-side detection peak as being a detection peak provided due to the road-side object.

4. An object-detecting system for a vehicle according to any of claim 2, wherein, when any of the descending-side detection peaks is determined as being a detection peak provided due to the road-side object, said road-side object peak determining means determines the ascending-side detection peak corresponding to the descending-side detection peak as a detection peak provided due to the road-side object.

5. An object-detecting system for a vehicle according to any of claim 1, wherein, when any of the ascending-side detection peaks is determined as being the detection peak provided due to the road-side object, said road-side object peak determining means determines the descending-side detection peak corresponding to the ascending-side detection peak as being a detection peak provided due to the road-side object.

6. An object-detecting system for a vehicle according to any of claim 1, wherein, when any of the descending-side detection peaks is determined as being a detection peak provided due to the road-side object, said road-side object peak determining means determines the ascending-side detection peak corresponding to the descending-side detection peak as a detection peak provided due to the road-side object.

7. An object-detecting system for a vehicle, comprising a transmitting/receiving means for transmitting an FM-CW wave and receiving a wave resulting from the reflection of the FM-CW wave from an object, a mixer for mixing the transmitted wave and the received wave with each other to produce a beat signal, a frequency analyzing means for frequency analysis of the beat signal produced in the mixer, a detection peak determining means for determining, as a detection peak, any peak signal equal to or larger than a detection threshold value among peak signals obtained based on a result of the frequency analysis of ascending-side and descending-side frequencies by the frequency analyzing means, and an object detecting means adapted to calculate at least one of a distance from a subject vehicle to an object and a speed of the subject vehicle relative to the object, based on the ascending-side and descending-side detection peaks obtained in the detection peak determining means, wherein said object-detecting system further includes a subject vehicle position detecting means for detecting the current position of the subject vehicle, map information storing means for storing map information, a road shape presuming means for presuming the shape of a road in a traveling direction of the subject vehicle based on a subject vehicle position information detected by the subject vehicle position detecting means and the map information provided from the map information storing means, and a road-side object peak determining means for determining at least a portion of detection peaks as being a detection peak provided due to a road-side object, based on the presumed shape of the road in the traveling direction of the subject vehicle, and wherein the object detecting means is adapted to calculate at least one of the distance from the subject vehicle to the object and the speed of the subject vehicle relative to the object, based on the detection peaks other than the detection peaks of the road-side objects.

8. An object-detecting system for a vehicle according to claim 7, wherein said road-side object peak determining means is adapted to dispose a plurality of detection peaks on coordinates with a detecting direction and a peak frequency used as respective parameters and to determine the arrangement of detection peaks resembling the shape of the road presumed by the road shape presuming means as being a detection peak provided due to the road-side object.

9. An object-detecting system for a vehicle according to any of claim 7, wherein, when any of the ascending-side detection peaks is determined as being the detection peak provided due to the road-side object, said road-side object peak determining means determines the descending-side detection peak corresponding to the ascending-side detection peak as being a detection peak provided due to the road-side object.

10. An object-detecting system for a vehicle according to any of claim 8, wherein, when any of the ascending-side detection peaks is determined as being the detection peak provided due to the road-side object, said road-side object peak determining means determines the descending-side detection peak corresponding to the ascending-side detection peak as being a detection peak provided due to the road-side object.

11. An object-detecting system for a vehicle according to any of claim 7, wherein, when any of the descending-side detection peaks is determined as being a detection peak provided due to the road-side object, said road-side object peak determining means determines the ascending-side detection peak corresponding to the descending-side detection peak as a detection peak provided due to the road-side object.

12. An object-detecting system for a vehicle according to any of claim 8, wherein, when any of the descending-side detection peaks is determined as being a detection peak provided due to the road-side object, said road-side object peak determining means determines the ascending-side detection peak corresponding to the descending-side detection peak as a detection peak provided due to the road-side object.

13. An object-detecting system for a vehicle, comprising a transmitting/receiving means for transmitting an FM-CW wave and receiving a wave resulting from the reflection of the FM-CW wave from an object, a mixer for mixing the transmitted wave and the received wave with each other to produce a beat signal, a frequency analyzing means for frequency analysis of the beat signal produced in the mixer, a detection peak determining means for determining, as a detection peak, any detection peak signal equal to or larger than a detection threshold value among peak signals obtained based on a result of the frequency analysis of ascending-side and descending-side frequencies by the frequency analyzing means, and an object detecting means adapted to calculate at least one of a distance from a subject vehicle to an object and a speed of the subject vehicle relative to the object, based on the ascending-side and descending-side detection peaks obtained in the detection peak determining means, wherein said object-detecting system further includes a road-vehicle communication means capable of providing information relating to the shape of a road in a traveling direction of the subject vehicle by carrying out the communication with a transmitting means mounted on the road, and a road-side object peak determining means for determining at least a portion of the detection peaks as being a detection peak provided due to the road-side object, based on the information relating to the shape of the road in the traveling direction of the subject vehicle provided by the road-vehicle communication means, and wherein the object detecting means is adapted to calculate at least one of the distance from the subject vehicle to the object and the speed of the subject vehicle relative to the object, based on the detection peaks other than the detection peaks of the road-side objects.

14. An object-detecting system for a vehicle according to claim 13, wherein said road-side object peak determining means is adapted to dispose a plurality of detection peaks on coordinates with a detecting direction and a peak frequency used as respective parameters, and to determine an arrangement of detection peaks resembling the shape of the road provided by the road-vehicle communication means as being detection peaks provided due to the road-side objects.

15. An object-detecting system for a vehicle according to any of claim 14, wherein, when any of the ascending-side detection peaks is determined as being the detection peak provided due to the road-side object, said road-side object peak determining means determines the descending-side detection peak corresponding to the ascending-side detection peak as being a detection peak provided due to the road-side object.

16. An object-detecting system for a vehicle according to any of claim 14, wherein, when any of the descending-side detection peaks is determined as being a detection peak provided due to the road-side object, said road-side object peak determining means determines the ascending-side detection peak corresponding to the descending-side detection peak as a detection peak provided due to the road-side object.

17. An object-detecting system for a vehicle according to any of claim 13, wherein, when any of the ascending-side detection peaks is determined as being the detection peak provided due to the road-side object, said road-side object peak determining means determines the descending-side detection peak corresponding to the ascending-side detection peak as being a detection peak provided due to the road-side object.

18. An object-detecting system for a vehicle according to any of claim 13, wherein, when any of the descending-side detection peaks is determined as being a detection peak provided due to the road-side object, said road-side object peak determining means determines the ascending-side detection peak corresponding to the descending-side detection peak as a detection peak provided due to the road-side object.

* * * * *